United States Patent Office 3,345,340
Patented Oct. 3, 1967

3,345,340
POLYMERIZING LACTAM TO POLYLACTAM WITH A SUBSTITUTED PHOSPHORANE COCATALYST
Harold G. Brouns, Woodbury, N.J., assignor to E. I. du Pont de Nemours and Company, Wilmington, Del., a corporation of Delaware
No Drawing. Filed Oct. 1, 1964, Ser. No. 400,881
20 Claims. (Cl. 260—78)

ABSTRACT OF THE DISCLOSURE

Polymerizing lactams, preferably having 3 to 12 carbon atoms in the lactam ring, to polylactams at a temperature below the melting point of the resulting polylactam employing as cocatalyst substituted phosphoranes represented by the structures $R^1PF_3NR_2^2$, $(R_2^2N)_2PF_3$, $(R_1PF_5)^-(R_2^2NH_2)^+$, $R_a^3PF_b$ and

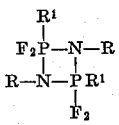

wherein R represents methyl or ethyl, $R^1$ represents a monovalent organic radical of up to 20 carbon atoms and fluorine, $R^2$ represents a monovalent aliphatic or alicyclic radical of up to 20 carbon atoms or a divalent aliphatic radical of up to 20 carbon atoms in which both valence bonds are joined to an adjacent nitrogen atom to form a cyclic structure, $R^3$ is a monovalent organic radical of up to 20 carbon atoms, $a$ is an integer from 1 through 3 and the sum of $a$ and $b$ is 5.

---

This invention relates to an improved process for the anionic polymerization of lactams. More particularly, this invention relates to an improved process for the rapid anionic polymerization of lactams at temperatures below the melting point of the resulting polyamide wherein substituted phosphoranes are employed as novel cocatalysts.

The polymerization of caprolactam to give a polyamide, 6 nylon, has been known for many years. The earliest processes described for this polymerization were quite slow, requiring several hours. More recently, it has been disclosed that the base-catalyzed polymerization of lactams for example, caprolactam, can be made especially fast by the addition of certain cocatalysts derived from organic and inorganic acids of particular types. Particularly effective cocatalysts for the anionic polymerization of lactams known to the art include acylating agents and acyl compounds, for example, acyl halides, anhydrides, imides, and the like. Other classes of cocatalysts which have been disclosed include organic isocyanates and substituted ureas.

The present invention provides a process for the polymerization of a lactam at a temperature above the melting point of the lactam and below the melting point of the resulting polyamide in the presence of an anionic catalyst, i.e. a lactam-base salt, formed by the reaction of a strong base with a lactam, and a cocatalyst consisting of substituted phosphoranes selected from the group consisting of compounds defined by the structure

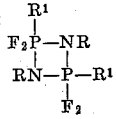

$R^1PF_3NR_2^2$, $(R_2^2N)_2PF_3$, $(R^1PF_5)^-(R_2^2NH_2)^+$, and $R_a^3PF_b$ wherein R is methyl or ethyl, $R^1$ is a monovalent organic radical of up to 20 carbon atoms or fluorine, $R^2$ is a monovalent aliphatic or alicyclic radical of up to 20 carbon atoms, or a divalent aliphatic radical of up to 20 carbon atoms in which both valence bonds are joined to an adjacent nitrogen atom to form a cyclic structure, $R^3$ is a monovalent organic radical of up to 20 carbon atoms, $a$ is an integer from 1 through 3, and the sum of $a$ and $b$ is 5.

A representative list of compounds coming within the scope of the present invention that are useful as cocatalysts in the anionic polymerization process include, among others, the following:

$(CH_3)_2NPF_4$
$(C_3H_7)_2NPF_4$
$(iso-C_3H_7)_2NPF_4$
$(C_4H_9)_2NPF_4$
$(iso-C_4H_9)_2NPF_4$
$(sec-C_4H_9)_2NPF_4$
$(n-C_5H_{11})_2NPF_4$
$(C_6H_5CH_2)_2NPF_4$
$(C_6H_5CH_2CH_2)_2NPF_4$
$(cyclohexyl)_2NPF_4$
$(cyclohexyl-CH_2)_2NPF_4$
$n-C_{10}H_{21}C_{10}H_7PF_3N(C_2H_5)_2$
$o,m-(CH_3)_2C_6H_3)PF_3N(n-C_{20}H_{41})_2$
$[(C_3H_7)_2NH_2]^{\oplus}[CH_3C_6H_5PF_5]^{\ominus}$
$[(C_4H_9)_2NH_2]^{\oplus}[C_3H_7PF_5]^{\ominus}$
$[(C_5H_{11})_2NH_2]^{\oplus}[C_4H_9PF_5]^{\ominus}$
$[(C_6H_{13})_2NH_2]^{\oplus}[cyclohexyl-PF_5]^{\ominus}$
$[(iso-C_4H_9)_2NH_2]^{\oplus}[C_6H_5CH_2PF_5]^{\ominus}$
$[(cyclohexyl)_2NH_2]^{\oplus}[p-CH_3O-C_6H_5PF_5]^{\ominus}$
$[(C_6H_5CH_2)_2NH_2]^{\oplus}[iso-C_3H_7PF_5]^{\ominus}$
$[(C_6H_5CH_2CH_2)_2NH]^{\oplus}[cyclohexyl-CH_2PF_5]^{\ominus}$
$((CH_3)_2N)_2PF_3$
$[(C_2H_5)_2N]_2PF_3$
$(n-C_3H_7)_2N)_2PF_3$
$(iso-C_3H_7)_2N)_2PF_3$
$(piperidyl)_2PF_3$
$(n-dodecylphenyl)_2NPF_4$
$(1-azacyclododecyl)PF_4$
$(1-azacyclooctadecyl)PF_4$
$C_2H_5PF_3N(C_2H_5)_2$
$CH_3PF_3N(C_5H_{11})_2$ $C_6H_5PF_3N\langle S \rangle$ $p-CH_3C_6H_4PF_3N(CH_3)_2$
$C_{10}H_7C_6H_7PF_3N(C_3H_7)_2$
$C_2H_5PF_4$
$C_6H_5PF_4$
$m-CH_3C_6H_4PF_4$
$p-C_6H_5C_6H_4PF_4$
1,3-dimethyl-2,4-diphenyl-2,2,4,4-tetrafluoro-1,3,2,4-diazadiphosphetidine
1,3-dimethyl-2,4-dibenzyl-2,2,4,4-tetrafluoro-1,3,2,4-diazadiphosphetidine
1,3-dimethyl-2,4-dicyclohexyl-2,2,4,4-tetrafluoro-1,3,2,4-diazadiphosphetidine
1-methyl-3-ethyl-2-phenyl-4-ethyl-2,2,4,4-tetrafluoro-1,3,2,4-diazadiphosphetidine
1-ethyl-3-methyl-2-propyl-4-isoamyl-2,2,4,4-tetrafluoro-1,3,2,4-diazadiphosphetidine
1-ethyl-3-methyl-2,4-diphenyl-2,2,4,4-tetrafluoro-1,3,2,4-diazadiphosphetidine The amount of substituted phosphorane that can be used as the cocatalyst in the anionic polymerization process is from about 0.05 to 5 mole percent, based on the weight of the lactam being polymerized, and preferably from 0.2 to 1 mole percent.

The diazadiphosphetidine cocatalysts of the present invention are prepared by contacting a $PF_cR_d^1$ component with an $R_3SiN(R)Si(R_3)$ component wherein R and $R^1$ are defined above and $c$ is an integer of 4 or 5 and the sum of $c$ and $d$ is 5. The reaction temperature is maintained between about 0° and about 150° C., with the preferred range being from about 20 to about 50° C. If the reaction temperature is higher than the boiling point of any reactant the reaction is then conducted in a sealed vessel of such construction as to withstand the pressure generated. Preferably, the ratio of the two components is stoichiometric; however, any ratio can be used. The yield is determined by the quantity of the reactant present in the lesser quantity.

If the diazadiphosphetidine cocatalyst has different substituents on the two nitrogen atoms or on the two phosphorus atoms it can be prepared by reacting a mixture of components. For example, if 1-methyl-3-ethyl-2-phenyl-4-ethyl-2,2,4,4-tetrafluoro - 1,3,2,4 - diazadiphosphetidine is desired a mixture of $(CH_3)_3SiN(CH_3)Si(CH_3)_3$ $(CH_3)_3SiN(C_2H_5)Si(CH_3)_3$, $C_6H_5PF_4$ and $C_2H_5PF_4$ is heated and reacted. The components of the resulting reaction products are then separated by distillation.

Heptamethylsilazane $(CH_3)_3SiN(CH_3)Si(CH_3)_3$ is prepared from $(CH_3)_3SiCl$ and $CH_3NH_2$ by a method given in Inorganic Syntheses, vol. V, p. 58, McGraw-Hill, 1957. For the preparation of other disilazanes, a similar procedure is used with the substitution of the appropriate chlorosilane for trimethylchlorosilane and the appropriate amine for methyl amine. For example, $(C_2H_5)_3SiN(C_2H_5)Si(C_2H_5)_3$ is prepared by treating $(C_2H_5)_3SiCl$ with $C_2H_5NH_2$ under similar conditions.

Inert solvents can be used if desired, to dilute the reactants but they are not required. Such solvents include, for example, benzene, toluene, xylene, cyclohexane, chlorobenzene, hexane, pentane, methylcyclohexane, ethylene chloride, chloroform, carbon tetrachloride, and 1,2-difluorotetrachloroethane.

The products generally are separated from the reaction mixture by distillation but recrystallization or other conventional techniques can be used.

The cocatalyst compounds of the present invention can be characterized as stable solids or liquids having surprising hydrolytic stability to aqueous media. For example, the compound exemplified hereinbelow, namely,

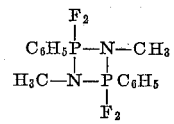

resists hydrolysis in boiling water for several hours. On the other hand, the corresponding chloro compounds are hydrolyzed almost immediately by water at room temperature.

The preparation of diazadiphosphetidines is more completely described in coassigned, copending application Ser. No. 301,985, filed Aug. 14, 1963.

The compounds of the types $R^1PF_3NR_2^2$, $(R_2^2N)_2PF_3$, $(R^1PF_5)^-(R_2^2NH_2)^+$ are prepared by reacting a component having the general formula $R^4PF_4$ with a compound having the formula $(R^2N)_{4-n}R^5$ at a temperature between 0 and 150° C. in a stoichiometric ratio and wherein R, $R^1$ and $R^2$ have the meanings given hereinbefore, $R^4$ is $R^1$ or $R_2^2N$, $R^5$ is hydrogen or $SiR_n$, and $n$ is the integer 2 or 3.

For example, $R^1PF_3NR_2^2$ can be made in two ways. Where $R^1$ is fluorine:

(1) $2PF_5 + 2R_2^2NH \rightarrow (R_2^2N)PF_4 + (R_2^2NH_2) + (PF_6)^-$ (2) $PF_5 + R_2^2NSiR_3 \rightarrow R_2^2NPF + R_3SiF$ Where R is an organic radical:

(1) $2R^1PF_4 + 2R_2^2NH \rightarrow R^1PF_3NR_2^2 + (R_2^2NH_2) + (R^1PF_5)^-$ (2) $R^1PF_4 + R_2^2NSiR_3 \rightarrow R^1PF_3NR_2^2 + R_3SiF$ Likewise $(R_2^2N)_2PF_3$ can be made by the following reaction:

(1) $R_2^2NPF_4 + R_2^2NSiR_3 \rightarrow (R_2^2N)_2PF_3 + R_3SiF$

Preparation of the $(R^1PF_5)^-$ anion salts is accomplished as described above.

Preparation of these compounds is more fully described in coassigned copending application Ser. No. 310, 128, filed Sept. 19, 1963, now U.S. Patent 3,300,503.

The $R_a^3PF_b$ compounds are well known and are prepared as described in Chemistry and Industry (London) 1962, 1868.

When $R^1$, $R^2$, $R^3$, and $R^4$ are hydrocarbon radicals their nature is not critical. However, they should not contain substituents which are reactive with the lactam polymerization system.

The following specific examples are given hereinbelow that describe in detail methods generally applicable for making cocatalyst compounds of the type described and used in the anionic polymerization of lactams in the present invention.

EXAMPLE 1

*Preparation of a diazadiphosphetidine*

18.4 parts of phenyltetrafluorophosphorane is added slowly, with stirring, to 13.15 parts of heptamethyldisilazane in a reaction vessel maintained at 50° C. and protected against atmospheric moisture. After about half of the fluorophosphorane is added a gas is evolved which is identified as trimethylfluorosilane by infrared absorption. The quantity of this gas amounts to 95% of theoretical yield. After all of the fluorophosphorane is added volatile material is removed at 0.1 mm. pressure and 30° C. 3.5 parts of unreacted phenyltetrafluorophosphorane is recovered. The remaining solid melts at 161° C. After two recrystallizations from benzene the melting point is raised to 162° C. indicating a high degree of purity in the crude product. The compound is identified as

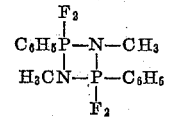

The element analysis is: Calcd. for $C_{14}H_{16}N_2P_2F_4$: C, 48.0; H, 4.6; F, 21.7; N, 8.0; P, 17.9. Found: C, 47.9; H, 5.2; F, 21.6; N, 8.2; P, 17.7.

The cryoscopic molecular weight in acetonitrile is 374 as compared to 350.2 theory.

The infrared spectrum as a solid in a KBr pellet is as follows: 3060 (w), 2940 (m), 2890 (vw), 2816 (w), 1820 (w), 1593 (w), 1486 (m), 1440 (s), 1420 (vw), 1383 (w), 1314 (m), 1230, 1172, 1123 (vs), 975 (m), 928 (w), 879, 849 (vw), 835, 829 (vs), 768, 760 (vs), 744, 735 (vs) 691 (vs), 605 (vs), 539 (vs), 503, 484 (s).

The ultraviolet spectrum (0.516 mg./ml. in cyclohexane) maxima at 257, 264 and 271 m$\mu$, extinction coefficient 13.060.

Attempted hydrolysis by heating in water at 100° C. for 3 hours fails. The product still has a melting point of 162° C. and the infrared spectrum is the same.

EXAMPLE 2

*Preparation of a $R^1PF_3NR_2^2$ compound*

Phenyltetrafluorophosphorane (40.5 parts) is added dropwise with stirring to 20.2 parts of dimethyl-bis(N,N-diethylamino)silazane. An exothermic reaction is observed but the temperature is held below 40° C. by cooling. After the addition the mixture is stirred for 40 minutes at 90° C. Vigorous evolution of gas (dimethyldifluorosilane—identified by infrared) occurs above 50° C. and an 84% yield of this gas is collected in a Dry Ice trap. The residue is distilled to give an 89% yield of $$C_6H_5PF_3N(C_2H_5)_2$$

boiling at 50°/0.08 mm.; $n_D^{26}$ 1.4695.

EXAMPLE 3

*Preparation of a*  *salt*

A three-necked flask is equipped with a gas inlet tube, a thermometer, and a reflux condenser with a drying tube. The system is flushed with dry nitrogen and charged with a solution of 44 parts of phenyltetrafluorophosphorane in 105 parts ether. Dimethylamine (11.0 parts), dried by passing it through a tube filled with sodium hydroxide pellets, is bubbled through the solution at 0° C. (2 hr.) A precipitate is formed temporarily but disappears upon removal of the ether solvent by distillation at atmospheric pressure. The remaining two-phase liquid mixture is distilled in vacuo through an 8-in. helix-packed column. Material boiling at 48–49° C./0.4 mm.; $n_D^{25}$=1.4796 is collected first. Yield of $C_6H_5PF_3N(CH_3)_2$ is 19.6 parts (79%). The higher boiling residue solidifies on standing. It is distilled at higher temperature, again solidifying readily after the distillation. B.P. 128–129° C./0.15 mm. Colorless solid, M.P. ca., 50° C.; yield of $$[(CH_3)_2NH_2]^+[C_6H_5PF_5]^-$$

*Analytical data.*—1. $C_6H_5PF_3N(CH_3)_2$: Calcd.: C, 45.9; H, 5.3; F, 27.2; N, 6.7; P, 14.8. Found: C, 45.8; H, 5.5; F, 27.8; N, 7.0; P, 14.7.

EXAMPLE 4

*Preparation of a* 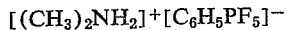 *compound*

A 3-necked flask is equipped with a gas inlet tube, a reflux condenser with a drying tube, and a thermometer. Under a countercurrent of nitrogen, a solution of 8.25 parts of diethylamine in 75 parts pentane is then placed into the flask. After cooling to ca. −50° C., a total of 8 g. (0.063 mole) of phosphorus pentafluoride is passed through the solution. No noticeable reaction takes place, but unreacted $PF_5$ is not observed. A viscous oil separates as the temperature is gradually allowed to rise to room temperature. The separated liquid is decanted and distilled to remove pentane. The higher boiling product comes over between 64–86° C./18 mm., mainly at the latter temperature. Purity by VPC was 95–97%, $n_D^{25.5}$=1.4046.

*Analysis.*—Calcd. for $[(C_2H_5)_2N]_2PF_3$: C, 41.3; H, 8.7; N, 12.1. Found: C, 41.3; H, 8.9; N, 11.4.

*Molecular weight* (mass spectroscopy).—Significant peaks at 233 (parent), 161 (parent less $N(C_2H_5)_2$), etc.

*IR Spectrum* (liquid).—2980 (s); 1486, 1470, 1450 (m); 1379, 1349 (s); 1297 (m); 1207, 1184 (vs); 1090, 1072 (s); 1041 (vs); 961, 942 (s); 839, 807 (vs); 736 (vs); 683 (w).

$F^{19}$ *NMR Spectrum* (liquid).—Doublet of doublets, $J_{P-F}$=751 cps., $J_{F-F}$=46 p.p.m., δ (CFCl₃ int.)=+59.5 p.p.m.; doublet of triplets, $J_{P-F}$=875 cps.; δ (CFCl₃)= +73.9 p.p.m. This pattern is typical of $RPF_3NF_2$ structures.

Accordingly, the above illustrates methods for preparing the compounds used as cocatalysts in the polymerization reaction of the present invention.

The polymerization process of this invention is particularly effective for rapidly producing high molecular weight polyamides from lactams or mixtures thereof, containing preferably from 3 to 12 or more carbon atoms in the lactam ring. Such lactams include, for example, pyrrolidone, piperidone, caprolactam, enantholactam, caprylolactam, and laurolactam. Generally, the anionic polymerization process is conducted at temperatures above the melting point of the lactam monomer but below the melting point of the resulting polyamide. In general, this temperature range is from about 25° C. to about 200° C., depending on the particular lactam or lactams employed. The preferred polymerization temperature is below about 150° C. with lactams having less than 6 carbon atoms in the lactam ring. Caprolactam is readily polymerized by the process of this invention at temperatures between 100 and 200° C. with 150° C. being a convenient and preferred operating temperature. Lactams having more than five carbon atoms are preferred for the practice of this invention and ϵ-caprolactam is especially preferred.

The lactam-base salts, i.e., anionic catalysts, used in the process of this invention are the reaction product of a strong base and a lactam. Generally, the lactam to be polymerized is used for the preparation of the lactam-base salt but if desired, the lactam-base salt can be prepared from one lactam and used in the polymerization of still another lactam.

The strong base employed to form the lactam-base salt, i.e., anionic catalyst, may be an alkali metal, an alkaline earth metal, or a strongly basic derivative of one of these metals such as hydroxide, alkoxide, hydride, alkyl, aryl, or amide. All of these bases are strong enough to convert the lactam to its iminium salt. Thus, sodium hydroxide, potassium hydroxide, lithium hydroxide, magnesium hydroxide, calcium hydroxide, strontium hydroxide, sodium methoxide, lithium hydride, sodium hydride, sodium methyl, sodium ethyl, sodium phenyl, sodium naphthyl, sodamide, and the like are suitable strong bases for the preparation of the anionic catalyst. Accordingly, the anionic catalyst is prepared by heating the lactam with a strong base at a temperature between about 25 and 225° C.

The strong base used to form the catalyst can be, if desired, diluted with inert materials such as mineral oil or other hydrocarbon materials for ease of handling. Sodium hydride is particularly susceptible to attack by moisture and the use of a mixture of NaH and an inert diluent, instead of pure NaH, is effective in making the addition of catalyst both safer and easier. HB–40, a partially hydrogenated terephenyl, is a particularly suitable diluent. The base may be added to the total lactam which is to be polymerized, or, to a portion of the lactam which is to be polymerized and this portion of the lactam containing the lactam-base salt, i.e., anionic catalyst, is added to more of the lactam later. Little or no polymerization occurs during the preparation of the anionic catalyst, which is carried out at a temperature between the melting point of the lactam and about 225° C. The time required for this step in the process varies and depends upon the strength of the base employed, the proportion added, and the temperature chosen and may take from a few seconds to several hours. Preferably, the lactam, and likewise the base with which the lactam is reacted, should be substantially anhydrous. The concentration of the base is between about 0.1 to about 10 mole percent based on the lactam polymerized. Proportions in the higher end of this range produce lower molecular weight polyamides, so optimum proportions for most purposes are from about 0.1 to 5 mole percent of the strong base.

It might be mentioned that for the optimum operation of the process of this invention, an inert gas such as nitrogen is bubbled through the molten lactam during the initial reaction of the base with the lactam to form the anionic catalyst, in order to remove any low molecular weight compound formed such as water and in order to prevent oxidation. Alternatively, the reaction of the lactam with the strong base may be carried out under reduced pressure in which case the low molecular weight compound is distilled from the lactam. Procedurally the cocatalyst used in the process can be added to the lactam containing the anionic catalyst, or equally well, the cocatalyst can be dissolved in a separate portion of the lactam and the two portions of lactam mixed at the time the polymerization is desired.

The process of this invention is useful in rapidly preparing cast articles of any size and shape from lactams and may be employed to obtain unusual shapes which would be difficult, if not impossible, to obtain by conventional molding of prepolymerized polyamides. The process has the additional advantage of not requiring high temperatures and high pressures normally required in injection molding techniques and similar processes to produce cast articles. Therefore, simpler lighter weight molds may be employed and faster cycles can often be obtained in the preparation of large shaped articles. The entire process can be carried out in a mold. Alternatively, the lactam solution containing the anionic catalyst and a second portion of the lactam solution containing the cocatalyst can be mixed and then immediately cast into a mold, by procedures similar to transfer molding, to obtain the desired shaped article in any size at a very high rate. Similarly, it is possible to employ the process of this invention in many extrusion-type operations, in which the lactam containing the anionic catalyst and another portion of the lactam containing the cocatalyst are intimately mixed and then extruded under conditions which provide for obtaining an extrudate which is polymerized as it is formed.

The process of this invention is operable in the presence of various fillers and reinforcing agents. Thus, for example, if desired, glass mats or mats of synthetic fibers can be impregnated with the solution and rapidly cured. Similarly, finely-divided fillers can be suspended in the polymerizing mixture to obtain filled polyamides. Antioxidants, plasticizers, resins or other polymers, colorants, and the like may also be employed. The process of this invention contemplates the use of the process under all of the above conditions.

The process of this invention can be conducted in the presence of a gas-generating material to give foamed plastic articles. The gas-generating material can be a low boiling liquid or an unstable compound which releases gas when heated. Representative gas-generating materials are, for example, allylic azides such as dodecenyl azide, bis(azidomethyl)durene, benzyl azide, p-methylbenzyl azide; azo compounds such as azobis(isobutyronitrile); low boiling hydrocarbons such as ethane, propane, butane, pentane and hexane and the like.

The process of this invention likewise can be carried out as a coating process, in which the lactam solution containing an anionic catalyst and a substituted phosphorane derivative cocatalyst is applied as a liquid to metal, plastic, wood or the surface of a web, such as paper or a textile and then permitted to polymerize to the polyamides and thus form a coating of polyamide film on a substrate.

The following examples more thoroughly illustrate the anionic polymerization reaction of lactams in the presence of cocatalyst wherein parts given are by weight.

EXAMPLES 5 THROUGH 25

*Procedure A*

$\epsilon$-Caprolactam (22.6 parts) is melted, heated to 150° C., and sparged 10–15 minutes with nitrogen. The base (for example, sodium hydride, 3 mole percent based on lactam) is added and the mix sparged an additional 5 minutes and the anionic catalyst, i.e., lactam-base salt is formed. The cocatalyst (for example, $(C_2H_5)_2NPF_4$, 0.6 mole percent), is added, the mix sparged for 30 seconds with nitrogen and allowed to stand under a nitrogen blanket at 150° C. until polymerization occurs. The "no flow time" is the time within which the mix becomes so viscous that no perceptible flow occurs when the polymerization tube is inclined at an angle of 45° and is 2 minutes in this example.

*Procedure B*

$\epsilon$-Caprolactam (11.3 parts) is melted, heated to 150° C., sparged with nitrogen for 10 to 15 minutes. The strong base, for example NaH, is added and the mix sparged with nitrogen for 30 minutes and the anionic catalyst, i.e., lactam-base salt, is formed. Another portion of $\epsilon$-caprolactam is melted, heated to 150° C. and sparged with nitrogen for 10–15 minutes. The cocatalyst for example, $C_6H_5PF_3N(C_2H_5)_2$ is added and the mix aged 30 minutes at 150° C. The two portions are then mixed and the polymerization occurs.

*Procedure C*

The same as procedure B, except that the two portions of lactam are aged only 5 minutes before mixing.

| Example No. | Cocatalyst | Mol., percent | Base | Mol., percent | No Flow Time (min.) | Procedure |
|---|---|---|---|---|---|---|
| 5 | $C_6H_5PF_4$ | 0.6 | NaH | 2.7 | 10 | A |
| 6 | $C_6H_5PF_4$ | 0.6 | NaH | 3.0 | 5 | A |
| 7 | iso-$C_8H_{17}PF_4$ | 0.6 | NaH | 3.8 | 1 | A |
| 8 | $(C_6H_5)_2PF_3$ | 0.6 | NaH | 3.3 | 5 | A |
| 9 | $(C_6H_5)(n-C_4H_9)_2PF_2$ | 0.4 | NaH | 1.5 | 11 | A |
| 10 | $(n-C_4H_9)_3PF_2$ | 0.6 | NaH | 2.7 | 5 | A |
| 11 | $\begin{array}{c} F_3P-N-CH_3 \\ \mid \quad \mid \\ H_3CN-PF_3 \end{array}$ | 0.4 | NaH | 3.0 | 4 | A |
| 12 | $\begin{array}{c} F_2 \\ \mid \\ C_2H_5P-NCH_3 \\ \mid \quad \mid \\ H_3CN-PC_2H_5 \\ \mid \\ F_2 \end{array}$ | 0.4 | NaH | 3.0 | 2.5 | A |
| 13 | $\begin{array}{c} F_2 \\ \mid \\ C_6H_5P-NCH_3 \\ \mid \quad \mid \\ H_3CN-PC_6H_5 \\ \mid \\ F_2 \end{array}$ | 0.4 | NaH | 3.0 | 2.7 | A |
| 14 | $C_2H_5PF_3N(C_2H_5)_2$ | 0.4 | NaH | 3.0 | 3 | A |
| 15 | $C_6H_5PF_2N(CH_3)_2$ | 0.4 | NaH | 3.0 | 7 | A |
| 16 | $C_6H_5PF_3N(C_2H_5)_2$ | 0.4 | NaH | 3.0 | 2.4 | A |
| 17 | $((CH_3)_2NH_2)^+(C_6H_5PF_5)^-$ | 0.4 | NaH | 3.0 | 8.7 | A |
| 18 | $((C_2H_5)_2NH)^+(C_6H_5PF_5)^-$ | 0.4 | NaH | 3.0 | 7 | A |
| 19 | $(C_2H_5)_2NPF_4$ | 0.6 | NaH | 3.0 | 2 | A |
| 20 | $\begin{array}{c} F_2 \\ \mid \\ p-F_3CC_6H_4P-NCH_3 \\ \mid \quad \mid \\ H_3CN-P-C_6H_4CF_3-p \\ \mid \\ F_2 \end{array}$ | 0.6 | NaH | 3.0 | 3.2 | A |

| Example No. | Cocatalyst | Mol., percent | Base | Mol., percent | No Flow Time (min.) | Procedure |
|---|---|---|---|---|---|---|
| 21 | $((C_2H_5)_2N)_2PF_3$ | 0.6 | NaH | 3.0 | 4.1 | A |
| 22 | $((C_2H_5)_2N)_2PF_3$ | 0.5 | NaH | 3.5 | 22 | B |
| 23 | $C_6H_5PF_3N(C_2H_5)_2$ | 0.5 | NaH | 3.5 | 5.9 | B |
| 24 | $((C_2H_5)_2N)_2PF_3$ | 0.5 | NaH | 3.5 | 44.7 | C |
| 25 | $C_6H_5PF_3N(C_2H_5)_2$ | 0.5 | NaH | 3.5 | 2.7 | C |

EXAMPLES 26–28

The procedure for the following examples is the same as that given in procedure A, except that other lactams and mixtures thereof are substituted for ε-caprolactam on an equimolar basis.

In Example 28 sodium methoxide was substituted for sodium hydride on an equimolar basis with equivalent results.

defined by the structures $R^1PF_3NR_2^2$, $(R_2^2N)_2PF_3$, $(R_1PF_5)^-(R_2^2NH_2)^+$, $R_a^3PF_b$ and

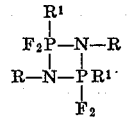

wherein R is selected from the group consisting of methyl

| Example No. | Lactam | Cocatalyst | Mol., percent | Base | Mol., percent | Procedure | No Flow Time (min.) |
|---|---|---|---|---|---|---|---|
| 26 | Laurolactam | $(C_2H_5)_2NPF_4$ | 0.4 | NaH/oil | 1.2 | A | 4.2 |
| 27 | do | 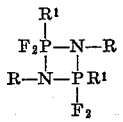 | 0.4 | NaH/oil | 2.0 | A | 19 |
| 28 | Laurolactam 80%<br>Caprylolactam 20% | $(C_2H_5)_2NPF_4$ | 0.2 | NaH/oil | 0.6 | A | 40 |

What is claimed is:

1. In a process for the polymerization of anhydrous lactams to polyamides which comprises heating said lactam to a temperature below the melting point of the resulting polyamide in the presence of a lactam-base salt and a cocatalyst, the improvement which comprises using as a cocatalyst a substituted phosphorane selected from the group consisting of compounds defined by the structures $R^1PF_3NR_2^2$, $(R_2^2N)_2PF_3$, $(R_1PF_5)^-(R_2^2NH_2)^+$, $R_a^3PF_b$ and $$\begin{array}{c} R^1 \\ | \\ F_2P-N-R \\ | \quad | \\ R-N-PR^1 \\ | \\ F_2 \end{array}$$

wherein R is selected from the group consisting of methyl and ethyl, $R^1$ is selected from the group consisting of a monovalent organic radical of up to 20 carbon atoms and fluorine, $R^2$ is selected from the group consisting of a monovalent aliphatic and alicyclic radical of up to 20 carbon atoms and a divalent aliphatic radical of up to 20 carbon atoms in which both valence bonds are joined to an adjacent nitrogen atom to form a cyclic structure, $R^3$ is a monovalent organic radical of up to 20 carbon atoms, $a$ is an integer from 1 through 3 and the sum of $a$ and $b$ is 5.

2. The process of claim 1 wherein the lactam is caprolactam.

3. The process of claim 1 wherein the amount of cocatalyst is from about 0.05 to 5 mole percent, based on the lactam being polymerized.

4. In a process for the polymerization of anhydrous lactams having from 3 to 12 carbon atoms in the ring which comprises heating said lactam to a temperature below the melting point of the resulting polyamide in the presence of a lactam-base salt made from about 0.1 to about 10 mole percent base based on the lactam, and a cocatalyst, the improvement which comprises using as a cocatalyst from about 0.05 to 5 mole percent, based on the lactam being polymerized, of a substituted phosphorane selected from the group consisting of compounds defined by the structures $R^1PF_3NR_2^2$, $(R_2^2N)_2PF_3$, $(R_1PF_5)^-(R_2^2NH_2)^+$, $R_a^3PF_b$ and $$\begin{array}{c} R^1 \\ | \\ F_2P-N-R \\ | \quad | \\ R-N-PR^1 \\ | \\ F_2 \end{array}$$

wherein R is selected from the group consisting of methyl and ethyl, $R^1$ is selected from the group consisting of a monovalent organic radical of up to 20 carbon atoms and fluorine, $R^2$ is selected from the group consisting of a monovalent aliphatic and alicyclic radical of up to 20 carbon atoms and a divalent aliphatic radical of up to 20 carbon atoms in which both valence bonds are joined to an adjacent nitrogen atom to form a cyclic structure, $R^3$ is a monovalent organic radical of up to 20 carbon atoms, $a$ is an integer from 1 through 3 and the sum of $a$ and $b$ is 5.

5. The process of claim 4 wherein the lactam is caprolactam.

6. The process of claim 4 wherein the lactam is laurolactam.

7. The process of claim 4 wherein the lactam is a mixture of at least two lactams.

8. The process of claim 4 wherein the lactam-base salt is the reaction product of caprolactam and sodium hydride.

9. The process of claim 4 wherein the lactam-base salt is the reaction product of caprolactam and sodium methoxide.

10. The process of claim 4 wherein the amount of cocatalyst is from about 0.2 to 1 mole percent.

11. In a process for the polymerization of anhydrous lactams having from 3 to 12 carbon atoms in the ring which comprises heating said lactam to a temperature below the melting point of the resulting polyamide in the presence of a lactam-base salt made from about 0.1 to about 10 mole percent base, based on the lactam, and a cocatalyst, the improvement which comprises using as a cocatalyst from about 0.05 to 5 mole percent, based on the lactam being polymerized, of a substituted phosphorane having the structure $R^1PF_3NR_2^2$ wherein $R^1$ is selected from the group consisting of a monovalent organic radical of up to 20 carbon atoms and fluorine and $R^2$ is selected from the group consisting of a monovalent aliphatic and alicyclic radical of up to 20 carbon atoms in which both valence bonds are joined to an adjacent nitrogen atom to form a cyclic structure.

12. The process of claim 11 wherein the lactam is caprolactam.

13. In a process for the polymerization of anhydrous lactams having from 3 to 12 carbon atoms in the ring which comprises heating said lactam to a temperature below the melting point of the resulting polyamide in the presence of a lactam-base salt made from about 0.1 to 10 mole percent base, based on the lactam, and a cocatalyst, the improvement which comprises using as a cocatalyst from about 0.05 to 5 mole percent, based on the lactam being polymerized, of a substituted phosphorane having the structure $(R_2{}^2N)PF_3$ wherein $R^2$ is selected from the group consisting of a monovalent aliphatic and alicyclic radical of up to 20 carbon atoms and a divalent aliphatic radical of up to 20 carbon atoms in which both valence bonds are joined to an adjacent nitrogen atom to form a cyclic structure.

14. The process of claim 13 wherein the lactam is caprolactam.

15. In a process for the polymerization of anydrous lactams having from 3 to 12 carbon atoms in the ring which comprises heating said lactam to a temperature below the melting point of the resulting polyamide in the presence of a lactam-base salt made from about 0.1 to about 10 mole percent base, based on the lactam, and a cocatalyst, the improvement which comprises using as a cocatalyst from about 0.05 to 5 mole percent, based on the lactam being polymerized, of a substituted phosphorane having the structure $(R^1PF_5)^-(R_2{}^2NH_2)^+$ wherein $R^1$ is selected from the group consisting of a monovalent organic radical of up to 20 carbon atoms and fluorine and $R^2$ is selected from the group consisting of a monovalent aliphatic and alicyclic radical of up to 20 carbon atoms and a divalent aliphatic radical of up to 20 carbon atoms in which both valence bonds are joined to an adjacent nitrogen atom to form a cyclic structure.

16. The process of claim 15 wherein the lactam is caprolactam.

17. In a process for the polymerization of anhydrous lactams having from 3 to 12 carbon atoms in the ring which comprises heating said lactam to a temperature below the melting point of the resulting polyamide in the presence of a lactam-base salt made from about 0.1 to about 10 mole percent base, based on the lactam, and a cocatalyst, the improvement which comprises using as a cocatalyst from about 0.05 to 5 mole percent, based on the lactam being polymerized, of a substituted phosphorane having the structure $R_a{}^3PF_b$ wherein $R^3$ is a monovalent organic radical of up to 20 carbon atoms, $a$ is an integer from 1 through 3 and the sum of $a$ and $b$ is 5.

18. The process of claim 17 wherein the lactam is caprolactam.

19. In a process for the polymerization of anhydrous lactams having from 3 to 12 carbon atoms in the ring which comprises heating said lactam to a temperature below the melting point of the resulting polyamide in the presence of a lactam-base salt made from about 0.1 to 10 mole percent base, based on the lactam, and a cocatalyst, the improvement which comprises using as a cocatalyst from about 0.05 to 5 mole percent based on the lactam being polymerized of a substituted phosphorane having the structure

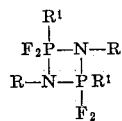

wherein R is selected from the group consisting of methyl and ethyl and $R^1$ is selected from the group consisting of a monovalent organic radical of up to 20 carbon atoms and fluorine.

20. The process of claim 19 wherein the lactam is caprolactam.

References Cited

UNITED STATES PATENTS

| | | | |
|---|---|---|---|
| 3,028,369 | 4/1962 | Butler et al. | 260—78 |
| 3,232,892 | 2/1966 | Fisher | 260—78 |
| 3,246,032 | 4/1966 | Schmutzler | 260—78 |

WILLIAM H. SHORT, *Primary Examiner.*

H. D. ANDERSON, *Assistant Examiner.*